US012686775B2

(12) United States Patent
Chevalier et al.

(10) Patent No.: US 12,686,775 B2
(45) Date of Patent: Jul. 21, 2026

(54) SILICONE RELEASE COATING EMULSION, METHOD FOR ITS PREPARATION, AND USE FOR BAKERY PAPER

(71) Applicant: Dow Silicones Corporation, Midland, MI (US)

(72) Inventors: Pierre Chevalier, Lille (FR); Cathy Dontaine, Seneffe (BE); Stephane Ugazio, Seneffe (BE)

(73) Assignee: Dow Silicones Corporation, Midland, MI (US)

(*) Notice: Subject to any disclaimer, the term of this patent is extended or adjusted under 35 U.S.C. 154(b) by 170 days.

(21) Appl. No.: 18/706,398

(22) PCT Filed: Dec. 9, 2022

(86) PCT No.: PCT/US2022/081222

§ 371 (c)(1),
(2) Date: May 1, 2024

(87) PCT Pub. No.: WO2023/146708

PCT Pub. Date: Aug. 3, 2023

(65) Prior Publication Data

US 2026/0152645 A1 Jun. 4, 2026

Related U.S. Application Data

(60) Provisional application No. 63/304,004, filed on Jan. 28, 2022.

(51) Int. Cl.

| | |
|---|---|
| ***C09D 183/04*** | (2006.01) |
| ***C09D 5/02*** | (2006.01) |
| ***C09D 5/16*** | (2006.01) |
| ***C09D 5/18*** | (2006.01) |
| ***C09D 7/61*** | (2018.01) |
| ***C09D 7/63*** | (2018.01) |
| ***C09D 7/65*** | (2018.01) |
| ***D21H 19/12*** | (2006.01) |
| ***D21H 21/16*** | (2006.01) |
| *A21D 8/08* | (2006.01) |

(52) U.S. Cl.

CPC ........... *C09D 5/1675* (2013.01); *C09D 5/022* (2013.01); *C09D 5/024* (2013.01); *C09D 5/1687* (2013.01); *C09D 5/18* (2013.01); *C09D 7/61* (2018.01); *C09D 7/63* (2018.01); *C09D 7/65* (2018.01); *C09D 183/04* (2013.01); *D21H 19/12* (2013.01); *D21H 21/16* (2013.01); *A21D 8/08* (2013.01)

(58) Field of Classification Search

None

See application file for complete search history.

(56) References Cited

U.S. PATENT DOCUMENTS

| | | | |
|---|---|---|---|
| 2,823,218 | A | 2/1958 | Speir et al. |
| 3,159,601 | A | 12/1964 | Ashby et al. |
| 3,220,972 | A | 11/1965 | Lamoreaux |
| 3,284,406 | A | 11/1966 | Nelson |
| 3,296,291 | A | 1/1967 | Scotia et al. |
| 3,419,593 | A | 12/1968 | Willing et al. |
| 3,516,946 | A | 6/1970 | Scotia et al. |
| 3,814,730 | A | 6/1974 | Karstedt et al. |
| 3,928,629 | A | 12/1975 | Chandra et al. |
| 3,957,713 | A | 5/1976 | Jeram et al. |
| 3,989,668 | A | 11/1976 | Lee et al. |
| 4,329,273 | A | 5/1982 | Hardman et al. |
| 4,510,094 | A | 4/1985 | Drahnak |
| 4,600,484 | A | 7/1986 | Drahnak |
| 4,766,176 | A | 8/1988 | Lee et al. |
| 4,772,515 | A | 9/1988 | Hara et al. |
| 4,784,879 | A | 11/1988 | Lee et al. |
| 4,916,169 | A | 4/1990 | Boardman et al. |
| 5,017,654 | A | 5/1991 | Togashi et al. |
| 5,036,117 | A | 7/1991 | Chung et al. |
| 5,169,920 | A | 12/1992 | Okawa |
| 5,175,325 | A | 12/1992 | Brown et al. |
| 5,317,072 | A | 5/1994 | Bokerman et al. |
| 6,046,250 | A | 4/2000 | Boardman et al. |
| 6,127,446 | A | 10/2000 | Butts |
| 6,376,569 | B1 | 4/2002 | Oxman et al. |
| 6,451,869 | B1 | 9/2002 | Butts |
| 6,605,734 | B2 | 8/2003 | Roy et al. |
| 6,806,339 | B2 | 10/2004 | Cray et al. |

(Continued)

FOREIGN PATENT DOCUMENTS

| | | |
|---|---|---|
| CN | 104031602 | 9/2014 |
| CN | 107522829 | 12/2017 |

(Continued)

OTHER PUBLICATIONS

Marciniec, "Hydrosilylation of Alkenes and Their Derivatives", Advances in Silicon Science, 2009, ch. 1, pp. 2-49.

(Continued)

*Primary Examiner* — Eli D. Strah

(74) *Attorney, Agent, or Firm* — Catherine U. Brown

(57) ABSTRACT

A silicone release coating emulsion includes a curable silicone release coating composition dispersed in an aqueous phase. The silicone release coating emulsion can be coated on a substrate (such as paper) to form a wet deposit, dried to form a layer of the silicone release coating composition on the substrate, and cured to form the silicone release coating on the surface of the substrate. The coated substrates are useful in food contact applications such as bakery release.

15 Claims, No Drawings

(56) References Cited

U.S. PATENT DOCUMENTS

| | | | |
|---|---|---|---|
| 6,956,087 | B2 | 10/2005 | Lai et al. |
| 8,088,878 | B2 | 1/2012 | Koellnberger |
| 8,642,674 | B2 | 2/2014 | Ikeno |
| 9,221,041 | B2 | 12/2015 | Brandstadt et al. |
| 2002/0061365 | A1 | 5/2002 | Grape et al. |
| 2005/0154079 | A1 | 7/2005 | Walker et al. |
| 2007/0099007 | A1 | 5/2007 | Benayoun et al. |
| 2007/0289495 | A1 | 12/2007 | Cray et al. |
| 2010/0292361 | A1 | 11/2010 | Koellnberger |
| 2011/0171400 | A1 | 7/2011 | Thompson et al. |
| 2019/0367744 | A1 | 12/2019 | Chevalier et al. |

FOREIGN PATENT DOCUMENTS

| | | | |
|---|---|---|---|
| CN | 110643054 | 1/2020 | |
| EP | 0398701 | 11/1990 | |
| EP | 0347895 | 11/1993 | |
| EP | 0841355 | 5/1998 | |
| EP | 2303949 | 1/2018 | |
| JP | 03865638 | 1/2007 | |
| JP | 2012092167 | 5/2012 | |
| WO | 2001058986 | 8/2001 | |
| WO | WO 2020/100936 A1 * | 5/2020 | .............. C09J 11/04 |
| WO | WO-2020232629 A1 * | 11/2020 | .............. C09J 7/401 |
| WO | WO-2021031185 A1 * | 2/2021 | .............. C09J 7/401 |

OTHER PUBLICATIONS

Nakajima, “Hydrosilylation Reaction of Olefins: Recent Advances and Perspectives,” RSC Advances, 2015, vol. 5, pp. 20603-20616.

* cited by examiner

SILICONE RELEASE COATING EMULSION, METHOD FOR ITS PREPARATION, AND USE FOR BAKERY PAPER

CROSS REFERENCE TO RELATED APPLICATIONS

This application is a U.S. national stage filing under 35 U.S.C. § 371 of PCT Application No. PCT/US22/081222 filed on 9 Dec. 2022, currently pending. which claims the benefit of U.S. Provisional Patent Application No. 63/304,004 filed 28 Jan. 2022 under 35 U.S.C. § 119(e). PCT Application No. PCT/US22/081222 and U.S. Provisional Patent Application No. 63/304,004 are each hereby incorporated by reference.

TECHNICAL FIELD

This invention pertains to a silicone release coating emulsion and methods for its preparation and use. More particularly, the silicone release coating emulsion is an aqueous emulsion including an aqueous continuous phase having dispersed therein silicone release coating composition, which is curable to form a silicone release coating suitable for use on various substrates, including paper, for food contact applications.

INTRODUCTION

Curable silicone compositions can be coated on substrates and cured to form coatings to improve or change various properties of the substrates. The substrates to which the compositions are applied can contain one or more materials. Such materials can be fibrous, which may be cellulosic, e.g., paper substrates such as paper or cardboard. The paper may be glazed or unglazed, calendared or un-calendared. Alternatively, the substrate can be plastics-based instead of paper-based, comprising for example acrylic, polycarbonate or polyethylene terephthalate material, or the substrate can be a laminate including paper and plastic.

Curable silicone compositions can be aqueous, solvent based or solventless compositions. Solventless compositions, such as SYL-OFF™ 7000 Coating from Dow Silicones Corporation of Midland, Michigan, USA, can be applied at a relatively high thickness (≥1 μm) and suffer from the drawback that they cannot be coated at reduced thickness using existing coating machinery. Furthermore, due to relatively high viscosities of the solventless compositions, undesirable misting during processing, and surface defects in the resulting coating, can occur particularly at high production speeds.

Aqueous compositions may be desired in several applications such as those requiring well controlled low thickness deposition and those bound to food regulations (e.g., food contact applications). A coated paper suitable for food contact applications may be obtained by treating a paper substrate with a compound or composition for forming a layer on the paper. A known treatment is based on fluorinated compounds that are able to provide non-stick properties by forming a film having low surface energy, which is resistant to chemical agents thereby providing oil, fat and water repellence to the treated paper. However environmental and health concerns were raised about fluorinated compounds, and the industry trend is to restrict or ban their use by various regulations, especially in the food packaging industry.

Another approach has been to treat a paper substrate with a mixture of polyvinyl alcohol and a chromate-fatty acid complex. However, the use of heavy metal such as chromium has also raised environmental and health concerns in food packaging related uses. Other treatments may confer some oleophobicity to the paper, but they often require relatively high amounts of material to be effective and form a thick coating on the paper, which may be detrimental to the mechanical properties and durability upon creasing or folding of the paper. Furthermore, use of high amounts of material may not be cost effective.

SUMMARY

A silicone release coating emulsion comprises: (A) an aliphatically unsaturated polyorganosiloxane, (B) a polyorganohydrogensiloxane, (C) a hydrosilylation reaction catalyst, (D) a hydrosilylation reaction inhibitor, (E) water, (F) a buffer, and (G) an alkenyloxypolyether.

DETAILED DESCRIPTION

The silicone release coating emulsion (emulsion) described above may optionally further comprise an additional starting material selected from the group consisting of (H) a polyvinyl alcohol compound, (I) a biocide, (J) an anti-foam, (K) a non-functional polyorganosiloxane, and (L) a combination of two or more of starting materials (H) to (K). Alternatively, the emulsion may consist essentially of (A) the aliphatically unsaturated polyorganosiloxane, (B) the polyorganohydrogensiloxane, (C) the hydrosilylation reaction catalyst, (D) the hydrosilylation reaction inhibitor, (E) water, (F) the buffer, and (G) the alkenyloxypolyether, and optionally the additional starting material selected from the group consisting of (H) the polyvinyl alcohol compound, (I) the biocide, (J) the anti-foam, (K) the non-functional polyorganosiloxane, and (L) the combination of two or more of (H) to (K). Alternatively, the emulsion may consist of (A) the aliphatically unsaturated polyorganosiloxane, (B) the polyorganohydrogensiloxane, (C) the hydrosilylation reaction catalyst, (D) the hydrosilylation reaction inhibitor, (E) water, (F) the buffer, (G) the alkenyloxypolyether; and optionally the additional starting material selected from the group consisting of (H) the polyvinyl alcohol compound, (I) the biocide, (J) the anti-foam, (K) the non-functional polyorganosiloxane, and (L) the combination of two or more of (H) to (K).

(A) Aliphatically Unsaturated Polyorganosiloxane

Starting material (A) in the emulsion described above is an aliphatically unsaturated polyorganosiloxane. Starting material (A), the aliphatically unsaturated polyorganosiloxane may have unit formula (A-I): $(R^1_3SiO_{1/2})_i(R^1_2R^3SiO_{1/2})_f(R^1_2SiO_{2/2})_g(R^1R^3SiO_{2/2})_h(SiO_{4/2})_j$, where each $R^1$ is an independently selected alkyl group or aryl group, each $R^3$ is an independently selected alkenyl group, subscripts i, f, g, h, and j represent average numbers of each siloxane unit in formula (A-I) and have values such that subscript i is 0 to 4; subscript f is 0 to 4; subscript g is 0 to 1400; subscript h is 0 to 200; and subscript j is 0 or 1; with the provisos that when a quantity (i+f)=2 to 4, then a quantity (f+h)≥2; and a quantity (i+f+g+h) is 15 to 1400. Alternatively, subscript g may be 0 to 1200. The aliphatically unsaturated polyorganosiloxane may be linear (when j=0) or branched (when j>0).

Suitable alkyl groups for $R^1$ may have 1 to 8 carbon atoms, such as methyl, ethyl, propyl (including isopropyl and n-propyl), butyl (including n-butyl, t-butyl, sec-butyl, and isobutyl), pentyl (including linear, branched and cyclic saturated hydrocarbon groups with 5 carbon atoms), hexyl (including linear, branched and cyclic saturated hydrocarbon groups with 6 carbon atoms), heptyl (including linear, branched and cyclic saturated hydrocarbon groups with 7 carbon atoms), and octyl (including linear, branched and cyclic saturated hydrocarbon groups with 8 carbon atoms). Suitable aryl groups include for $R^1$ may have 6 to 20 carbon atoms, such as phenyl, tolyl, xylyl, naphthyl, and styryl. Alternatively, the aryl group may be phenyl. Alternatively, each $R^1$ may be methyl or ethyl. Alternatively, each $R^1$ may be methyl or phenyl. Alternatively, each $R^1$ may be methyl.

Suitable alkenyl groups for $R^3$ are exemplified by vinyl, allyl and hexenyl. Alternatively, $R^3$ may be selected from the group consisting of vinyl and allyl. Alternatively, $R^3$ may be selected from the group consisting of vinyl and hexenyl. Alternatively, each $R^3$ may be vinyl.

Alternatively, when subscript j=0, the aliphatically unsaturated polyorganosiloxane may be linear. The linear aliphatically unsaturated polyorganosiloxane may comprise unit formula (A-II): $(R^1_3SiO_{1/2})_i(R^1_2R^3SiO_{1/2})_f(R^1_2SiO_{2/2})_g(R^1R^3SiO_{2/2})_h$, where $R^1$ is an independently selected alkyl group or aryl group as described above, $R^3$ is an independently selected alkenyl group as described above, subscript i is 0, 1, or 2; subscript f is 0, 1, or 2; subscript g is 0 to 1200; and subscript h is 0 to 200; with the provisos that the quantity (i+f)=2, the quantity (f+h)≥2, and the quantity (i+f+g+h) is 15 to 1200.

Alternatively, the linear aliphatically unsaturated polyorganosiloxane may comprise a bis-alkenyl-endblocked polydialkylsiloxane (when i=0, f=2, and h=0). The bis-alkenyl-endblocked polydialkylsiloxane may have unit formula (A-III): $(R^1_2R^3SiO_{1/2})_2(R^1_2SiO_{2/2})_g$, where each $R^1$ is an alkyl group, each $R^3$ is an alkenyl group, and subscript g is 15 to 1200.

Alternatively, the linear aliphatically unsaturated polyorganosiloxane may comprise a poly(dialkyl/alkylvinyl)siloxane (when g>0 and h>0). The poly(dialkyl/alkylvinyl) siloxane may have unit formula (A-IV): $(R^3R^1_2SiO_{1/2})_2(R^1_2SiO_{2/2})_g(R^1R^3SiO_{2/2})_h$, where each $R^1$ is an alkyl group, each $R^3$ is an alkenyl group, subscript g is >0 to 1200, and subscript h is 2 to 200.

Alternatively, starting material (A) may comprise a linear aliphatically unsaturated polyorganosiloxane such as i) α,ω-dimethylvinylsiloxy-terminated polydimethylsiloxane,
ii) α,ω-dimethylvinylsiloxy-terminated poly(dimethylsiloxane/methylvinylsiloxane),
iii) α,ω-dimethylvinylsiloxy-terminated polymethylvinylsiloxane,
iv) α,ω-trimethylsiloxy-terminated poly(dimethylsiloxane/methylvinylsiloxane),
v) α,ω-trimethylsiloxy-terminated polymethylvinylsiloxane,
vi) α,ω-dimethylvinylsiloxy-terminated poly(dimethylsiloxane/methylphenylsiloxane/methylvinylsiloxane),
vii) α,ω-dimethylvinylsiloxy-terminated poly(dimethylsiloxane/methylphenylsiloxane),
viii) α,ω-dimethylvinylsiloxy-terminated poly(dimethylsiloxane/diphenylsiloxane),
ix) α,ω-phenyl,methyl,vinyl-siloxy-terminated polydimethylsiloxane,
x) a combination of two or more of i) to ix).

Methods of preparing linear aliphatically unsaturated polydiorganosiloxanes described above for starting material (A), such as hydrolysis and condensation of the corresponding organohalosilanes and oligomers or equilibration of cyclic polydiorganosiloxanes, are known in the art, see for example U.S. Pat. Nos. 3,284,406; 4,772,515; 5,169,920; 5,317,072; and 6,956,087.

In addition to (or instead of) the above described linear aliphatically unsaturated polydiorganosiloxane, starting material (A) may comprise a branched aliphatically unsaturated polyorganosiloxane. The branched aliphatically unsaturated polyorganosiloxane may have >0 to 5 mol % of quadrifunctional units to the branched aliphatically unsaturated polyorganosiloxane. For example, the branched aliphatically unsaturated polyorganosiloxane may have unit formula (A-V): $(R^1_3SiO_{1/2})_i(R^1_2R^3SiO_{1/2})_f(R^1_2SiO_{2/2})_g(SiO_{4/2})_j$, where $R^1$ and $R^3$ are as described above, and subscripts i, f, g, and j have average values such that 2≥i≥0, 4≥f≥0, 995≥g≥4, j=1, (i+f)=4, and (i+f+g+j)>50. Alternatively, the quantity (i+f+g+j) may have a value sufficient to impart a viscosity >170 mPa·s measured by rotational viscometry (as described below with the test methods). Alternatively, viscosity may be >170 mPa·s to 1000 mPa·s, alternatively >170 to 500 mPa·s, alternatively 180 mPa·s to 450 mPa·s, and alternatively 190 mPa·s to 420 mPa·s. Suitable branched aliphatically unsaturated polyorganosiloxanes for starting material (A) are known in the art and can be made by known methods, exemplified by those disclosed in U.S. Pat. No. 6,806,339 and U.S. Patent Publication 2007/0289495.

(B) Polyorganohydrogensiloxane

Starting material (B) in the emulsion is a polyorganohydrogensiloxane. The polyorganohydrogensiloxane may have unit formula (B-I):

$(R^1_3SiO_{1/2})_w(R^1_2HSiO_{1/2})_x(R^1_2SiO_{2/2})_y(R^1HSiO_{2/2})_z$, where $R^1$ is as described above, subscripts w, x, y, and z represent average number of each siloxane unit per molecule and have values such that subscript w is 0, 1, or 2; subscript x is 0, 1, or 2; subscript y is 0 to 250; and subscript z is 1 to 250; with the provisos that a quantity (w+x)=2; a quantity (x+z)≥2; and a quantity (w+x+y+z) is 10 to 300. Alternatively, subscript w may be 2, and subscript x may be 0. Alternatively, subscript y may be >0 to 250. Alternatively, when (A) the aliphatically unsaturated polyorganosiloxane has two silicon bonded alkenyl groups per molecule, such as when (A) is i) α,ω-dimethylvinylsiloxy-terminated polydimethylsiloxane, then the quantity (x+z)≥3.

Alternatively, when x=y=0 and w=2, (B) the polyorganohydrogensiloxane may have unit formula (B-II): $(R^1_3SiO_{1/2})_2(R^1HSiO_{2/2})_z$, where $R^1$ is as described above, and z is 3 to 250.

Suitable polyorganohydrogensiloxanes for use herein are exemplified by:

(i) α,ω-dimethylhydrogensiloxy-terminated poly(dimethylsiloxane/methylhydrogensiloxane),
(ii) α,ω-dimethylhydrogensiloxy-terminated polymethylhydrogensiloxane,
(iii) α,ω-trimethylsiloxy-terminated poly(dimethylsiloxane/methylhydrogensiloxane),
(iv) α,ω-trimethylsiloxy-terminated polymethylhydrogensiloxane, and
(v) α-dimethylhydrogensiloxy-ω-trimethylsiloxy-terminated poly(dimethylsiloxane/methylhydrogensiloxane), (vi) α-dimethylhydrogensiloxy-ω-trimethylsiloxy-terminated polymethylhydrogensiloxane, (vii) α,ω-dimethylhydrogensiloxy-terminated polydimethylsiloxane, and (viii) a combination of two or more thereof.

Polyorganohydrogensiloxanes are also commercially available, such as those available from Gelest, Inc. of Morrisville, Pennsylvania, USA, for example, HMS-H271, HMS-071, HMS-993, HMS-301, HMS-301 R, HMS-031, HMS-991, HMS-992, HMS-993, HMS-082, HMS-151, HMS-013, HMS-053, and HMS-HM271. Methods of preparing linear and branched polyorganohydrogensiloxanes suitable for use herein, such as hydrolysis and condensation of organohalosilanes, are well known in the art, as exemplified in U.S. Pat. No. 2,823,218 to Speier, U.S. Pat. No. 3,957,713 to Jeram et al. and U.S. Pat. No. 4,329,273 to Hardman, et al.

Starting material (B) the polyorganohydrogensiloxane is used in the emulsion in an amount sufficient to provide a molar ratio of silicon bonded hydrogen atoms in starting material (B) to an amount of alkenyl groups in starting material (A) (i.e., an SiH:SiVi ratio) of 1.2:1 to 3.0:1, alternatively 1.4:1 to 2.5:1.

(C) Hydrosilylation Reaction Catalyst

Starting material (C) in the emulsion is a hydrosilylation reaction catalyst. This catalyst will promote a reaction between the alkenyl groups in starting material (A) and the silicon bonded hydrogen atoms in starting material (B). Said catalyst may comprise a metal selected from Fe, Ni, Co, Zr, Ti, or a platinum group metal. Alternatively, the metal may comprise the platinum group metal. The platinum group metal may be selected from the group consisting of platinum, rhodium, ruthenium, palladium, osmium, and iridium. Alternatively, the platinum group metal may be platinum. The hydrosilylation reaction catalyst may be (C-I) a radiation activatable catalyst, i.e., capable of catalyzing hydrosilylation reaction after irradiation (exposure to actinic radiation, e.g., exposure to visible or UV light), (C-II) a hydrosilylation catalyst activatable by means other than irradiation, e.g., capable of catalyzing hydrosilylation reaction without irradiation, such as by heating, or (C-III) a combination of both (C-I) and (C-II).

Suitable radiation activatable catalysts for use as starting material (C-I) may be activated by exposure to radiation with a wavelength of 200 nm to 500 nm. Suitable radiation activatable hydrosilylation reaction catalysts include cyclopentadienyl platinum complexes such as η5-cyclopentadienyl)tri(α-alkyl)platinum(IV); cyclopentadienyltrimethylplatinum and trimethyl(methylcyclopentadienyl)platinum (IV), cyclooctadienyl platinum complexes such as η4-1,5-cyclooctadienediarylplatinum complexes; and Pt(II)-β diketonate complexes such as bis(acetylacetonato)platinum (II). Examples of cyclopentadienyl platinum complexes are known in the art and are disclosed, for example in U.S. Pat. No. 4,510,094 to Drahnak; U.S. Pat. No. 4,600,484 to Drahnak; U.S. Pat. No. 4,916,169 to Boardman et al.; U.S. Pat. No. 6,127,446 to Butts; U.S. Pat. No. 6,451,869 to Butts; U.S. Pat. No. 6,376,569 to Oxman et al.; U.S. Pat. No. 8,088,878 to Koellnberger; and CN101925608B. Cyclooctadienyl platinum complexes are disclosed, for example, in U.S. Pat. No. 6,046,250 to Boardman et al. Platinum (II) beta-diketonate catalysts are disclosed, for example, in EP0398701B1 to Oxman et al.; U.S. Pat. No. 8,642,674 to Ikeno; and CN104031602A. U.S. Patent Application Publication 2005/0154079 to Walker et al.; U.S. Patent Application Publication 2011/0171400A1 to Thompson et al. and JP 03865638 B2 to Ikeno each disclose various radiation activatable hydrosilylation reaction catalysts as well.

Alternatively, the hydrosilylation reaction catalyst may be (C-II) a hydrosilylation catalyst activatable by means other than irradiation. For example, (C-II) may be (C-II-1) the platinum group metal, described above; (C-II-2) a compound of such a metal, for example, chlorotris(triphenylphosphine)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and (C-II-3) a complex of a compound, (C-II-2), with an alkenyl functional organopolysiloxane oligomer such as an alkenyl functional polydialkylsiloxane, or (C-II-4) a platinum group metal compound microencapsulated in a matrix or coreshell type structure. Complexes of platinum with alkenyl functional organopolysiloxane oligomers include 1,3-diethenyl-1,1,3,3-tetramethyldisiloxane complexes with platinum (Karstedt's Catalyst) and Pt(0) complex in tetramethyltetravinylcyclotetrasiloxane (Ashby's Catalyst). Alternatively, the hydrosilylation reaction catalyst may be (C-II-5) a compound or complex, as described above, microencapsulated in a resin matrix. Specific examples of suitable platinum-containing catalysts for (C-II) include chloroplatinic acid, either in hexahydrate form or anhydrous form, or a platinum-containing catalyst which is obtained by a method comprising reacting chloroplatinic acid with an aliphatically unsaturated organosilicon compound such as divinyltetramethyldisiloxane, or alkene-platinum-silyl complexes as described in U.S. Pat. No. 6,605,734 to Roy. These alkene-platinum-silyl complexes may be prepared, for example by mixing 0.015 mole (COD) $PtCl_2$ with 0.045 mole COD and 0.0612 moles $HMeSiCl_2$, where COD represents cyclooctadienyl and Me represents methyl. Other exemplary hydrosilylation reaction catalysts are described in U.S. Pat. No. 2,823,218 to Speier; U.S. Pat. No. 3,159,601 to Ashby; U.S. Pat. No. 3,220,972 to Lamoreaux; U.S. Pat. No. 3,296,291 to Chalk, et al.; U.S. Pat. No. 3,419,593 to Willing; U.S. Pat. No. 3,516,946 to Modic; U.S. Pat. No. 3,814,730 to Karstedt; U.S. Pat. No. 3,928,629 to Chandra; U.S. Pat. No. 3,989,668 to Lee, et al.; U.S. Pat. No. 4,766,176 to Lee, et al.; U.S. Pat. No. 4,784,879 to Lee, et al.; U.S. Pat. No. 5,017,654 to Togashi; U.S. Pat. No. 5,036,117 to Chung, et al.; and U.S. Pat. No. 5,175,325 to Brown; and EP 0 347 895 A to Togashi, et al. U.S. Patent Application Publication 2019/0367744 to Chevalier et al. discloses both (C-II) radiation activatable catalysts and (C-II) catalysts activatable by means other than radiation (e.g., heat activatable catalysts). Other hydrosilylation reaction catalysts that may be used herein are as disclosed in "Hydrosilylation reaction of olefins: recent advances and perspectives," by Y. Nakajima and S. Shimada, RSC Adv., 2015, 5, 20603-20616 and "Hydrosilylation, Advances in Silicon Science," Chapter 1, Hydrosilylation of Alkenes and Their Derivatives, B. Marciniec (ed.) DOI 10.1007/978-1-4020-8172-9 1, © Springer Science+Business Media B.V. 2009 (pp. 2-49). Suitable hydrosilylation reaction catalysts for starting material (C-II) are commercially available, for example, SYL-OFF™ 4000 Catalyst and SYL-OFF™ 2700 are available from Dow Silicones Corporation of Midland, Michigan, USA.

Starting material (C) may be one hydrosilylation reaction catalyst or a combination of two or more of the hydrosilylation reaction catalysts described above. For example, starting material (C) may be a combination of (C-I) and (C-II), e.g., when both exposure to radiation and heating will be used for hydrosilylation reaction. Alternatively, starting material (C) may be a combination of two or more radiation activatable catalysts, such as a combination of a cyclopentadienyl platinum complex and a Pt(II)-β diketonate complex. One skilled in the art would recognize that certain catalyst species may be activated by either irradiating or heating, as described herein and that when a combination of two or more catalysts is used, the catalyst species selected will differ from one another.

The amount of (C) the hydrosilylation reaction catalyst in the emulsion will depend on various factors including the selection of starting materials (A) and (B); and their respective contents of alkenyl groups and silicon bonded hydrogen atoms, and the amount of (D) hydrosilylation reaction inhibitor present in the composition, however, the amount of catalyst is sufficient to catalyze hydrosilylation reaction of SiH and alkenyl groups, alternatively the amount of catalyst is sufficient to provide at least 10 ppm, alternatively at least 15 ppm, alternatively at least 20 ppm, alternatively at least 50 ppm, and alternatively at least 100 ppm, by mass of the platinum group metal based on combined amounts of starting materials (A), (B), (C), (D), (E), (F), and (G) in the emulsion. At the same time, the amount of catalyst is sufficient to provide up to 1,000 ppm, alternatively up to 800 ppm, alternatively up to 500 ppm, and alternatively up to 100 ppm by mass of the platinum group metal, based on combined weights of starting materials (A) and (B) in the emulsion.

(D) Hydrosilylation Reaction Inhibitor

Starting material (D) in the emulsion is a hydrosilylation reaction inhibitor (inhibitor). The inhibitor may be used for altering the hydrosilylation reaction, as compared to a silicone release coating composition containing the same starting materials but with the inhibitor omitted. Starting material (D) may be, for example, (D1) an acetylenic alcohol, (D2) a silylated acetylenic alcohol, (D3) an ene-yne compound, (D4) a triazole, (D5) a phosphine, (D6) a mercaptan, (D7) a hydrazine, (D8) an amine, (D9) a fumarate, (D10) a maleate, (D11) an ether, (D12) carbon monoxide, (D13) an alkenyl-functional siloxane oligomer, and (D14) a combination of two or more thereof. Alternatively, the hydrosilylation reaction inhibitor may be selected from the group consisting of (D1) an acetylenic alcohol, (D2) a silylated acetylenic alcohol, (D9) a fumarate, (D10) a maleate, (D13) a combination of two or more thereof. Alternatively, the hydrosilylation reaction inhibitor may be selected from the group consisting of (D1) an acetylenic alcohol, (D2) a silylated acetylenic compound, (D9) a fumarate, (D10) a maleate, (D13) carbon monoxide, and (D14) a combination of two or more thereof. Alternatively, the hydrosilylation reaction inhibitor may be an acetylenic alcohol.

Acetylenic alcohols are exemplified by 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof. Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above. The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. The silylated acetylenic compound useful as the inhibitor herein may be prepared by methods known in the art, for example, U.S. Pat. No. 6,677,407 to Bilgrien, et al. discloses silylating an acetylenic alcohol described above by reacting it with a chlorosilane in the presence of an acid receptor.

Alternatively, the inhibitor may be an ene-yne compound such as 3-methyl-3-penten-1-yne; 3,5-dimethyl-3-hexen-1-yne; and a combination thereof. Alternatively, the inhibitor may comprise a triazole, exemplified by benzotriazole. Alternatively, the inhibitor may comprise a phosphine. Alternatively, the inhibitor may comprise a mercaptan. Alternatively, the inhibitor may comprise a hydrazine. Alternatively, the inhibitor may comprise an amine. Amines are exemplified by tetramethyl ethylenediamine, 3-dimethylamino-1-propyne, n-methylpropargylamine, propargylamine, 1-ethynylcyclohexylamine, or a combination thereof. Alternatively, the inhibitor may comprise a fumarate. Fumarates include dialkyl fumarates such as diethyl fumarate, dialkenyl fumarates such as diallyl fumarate, dialkoxyalkyl fumarates such as bis-(methoxymethyl)ethyl fumarate. Alternatively, the inhibitor may comprise a maleate. Maleates include dialkyl maleates such as diethyl maleate, dialkenyl maleates such as diallyl maleate, and dialkoxyalkyl maleates such as bis-(methoxymethyl)ethyl maleate. Alternatively, the inhibitor may comprise an ether.

Alternatively, the inhibitor may comprise carbon monoxide. Alternatively, the inhibitor may comprise an alkenyl-functional siloxane oligomer, which may be cyclic or linear such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, 1,3-divinyl-1,3-diphenyl-1,3-dimethyldisiloxane; 1,3-divinyl-1,1,3,3-tetramethyldisiloxane; and a combination of two or more thereof. The compounds useful as inhibitors described above are commercially available, e.g., from Sigma-Aldrich Inc. or Gelest, Inc., and Suitable inhibitors for use herein are exemplified by those described as stabilizer E in U.S. Patent Application Publication 2007/0099007 at paragraphs to [0165].

Starting material (D) may be one hydrosilylation reaction inhibitor or a combination of two or more of the hydrosilylation reaction inhibitors described above. The amount of inhibitor used will depend on various factors including the desired reaction rate, the particular inhibitor used, and the selection and amounts of each of starting materials (A) to (C). However, when present, the amount of inhibitor may be >0 parts by mass, alternatively 0.02 weight part to 0.8 weight part, per 100 weight parts of starting material (A).

(E) Water

Starting material (E) is water, which is not generally limited, and may be utilized neat (i.e., without any carrier vehicles/solvents), and/or pure (i.e., free of minerals and/or other impurities). For example, the water may be processed or unprocessed prior to its combination with other starting materials in the emulsion. Examples of processes that may be used for purifying the water include distilling, filtering, deionizing, and combinations of two or more thereof, such that the water may be deionized, distilled, and/or filtered. Alternatively, the water may be unprocessed (e.g. may be tap water, i.e., provided by a municipal water system or well water, used without further purification). The water may be utilized in any amount, which will be selected by one of skill in the art, depending on various factors, including the desired dilution of the emulsion. However, the amount of water may be 30% to 99%, alternatively 50% to 99%, alternatively 50% to 95%, based on combined weights of all starting materials in the emulsion.

(F) Buffer System

A buffer system (buffer) for maintaining a desired pH of the emulsion may be any suitable buffer, which may comprise a mono or polyprotic acid and its conjugate base. For example, a buffer comprising $HCO_3^-/CO_3^{2-}$ and $H_2PO_4^-/HPO_4^{2-}$ described as agent Fin U.S. Patent Application Publication 2007/0099007 at paragraphs to may be used herein. The buffer may comprise $NaCO_3$ and $NaHCO_3$; and/or citric acid and a citrate salt such as potassium citrate or sodium citrate. The amount of the buffer may be >0, alternatively at least 0.2 weight parts and alternatively at least 0.4 weight parts, per 100 weight parts of starting material (A). At the same time, the amount of buffer may be up to 1.6 weight parts, alternatively up to 1.5 weight parts, alternatively up to 1.25 weight parts, per 100 parts of starting material (A).

(G) Reactive Olefinic Surfactant

Starting material (G) is an alkenyloxypolyether, which is used to emulsify the silicone release coating composition in the water and which is also reactive. The alkenyloxypolyether may be substantially linear or linear. The linear alkenyloxypolyether may have formula (G-I):

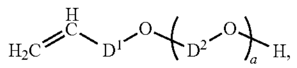

where $D^1$ is a divalent hydrocarbon group of 1 to 30 carbon atoms, each $D^2$ is an independently selected divalent hydrocarbon group of 2 to 10 carbon atoms, subscript a is ≥2. Alternatively, subscript a may be at least 2, alternatively at least 4, alternatively at least 6, alternatively at least 8, and alternatively at least 10; while at the same time, subscript a may be up to 150, alternatively up to 70, alternatively up to 30, alternatively up to 24, alternatively up to 20, alternatively up to 18, and alternatively up to 16. The divalent hydrocarbon group for $D^1$ and/or $D^2$ may be free of aliphatic unsaturation. $D^1$ (when $D^1$ has more than 1 carbon atom) and/or $D^2$ may be linear or branched. Examples of divalent hydrocarbyl groups for $D^2$ include alkane-diyl groups of empirical formula $—C_dH_{2d}—$, where subscript d is 2 to 10, alternatively 2 to 8, alternatively 2 to 6, and alternatively 2 to 4. D1 may have empirical formula $—C_eH_{2e}—$, where subscript e is 1 to 30, alternatively 1 to 20, alternatively 1 to 10, and alternatively 1 to 4. The alkane-diyl group for D1 and/or D2 may be a linear alkane-diyl, e.g., $—CH_2—CH_2—$, $—CH_2—CH_2—CH_2—$, $—CH_2—CH_2—CH_2—CH_2—$, or $—CH_2—CH_2—CH_2—CH_2—CH_2—CH_2—$, or a branched alkane-diyl, e.g.,

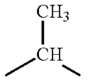 , 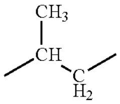 , 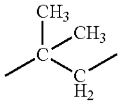 , or

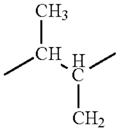 .

Alternatively, each $D^2$ may be an alkane-diyl group of at least 2, alternatively at least 3, alternatively at least 4 carbon atoms; while at the same time $D^2$ may be an alkane-diyl group of up to 6, alternatively up to 5, alternatively up to 46 carbon atoms. Alternatively, each $D^2$ may have 2, 3, or 4 carbon atoms. Alternatively, each $D^1$ may have 1 carbon atom. Alternatively, when $D^1$ has one carbon atom and $D^2$ has 2 carbon atoms, then the alkenyloxypolyether may have formula (G-II):

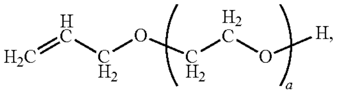

where subscript a is as described above. Alternatively, subscript a may be at least 2, alternatively at least 4, alternatively at least 6, alternatively at least 8, and alternatively at least 10; while at the same time, subscript a may be up to 30, alternatively up to 24, alternatively up to 20, alternatively up to 18, and alternatively up to 16.

Suitable alkenyloxypolyethers are known in the art and are commercially available, such as an allyloxypolyoxyethylene with 10 ethylene oxide units per molecule (i.e., formula G-II where a=10) sold under the tradename PLURIOL™ 10R or an allyloxypolyoxyethylene with 16 ethylene oxide units per molecule sold under the tradename PLURIOL™ 750 R, both from BASF. Other commercially available alkenyloxypolyethers include PLURIOL™ A 300 V, PLURIOL™ A 3090 V, PLURIOL™ A 5890 V, PLURIOL™ A1190 I, and PLURIOL™ A 700 VP, also from BASF.

The amount of (G) the alkenyloxypolyether depends on various factors, including whether starting material (H) the polyvinyl alcohol compound, is present, however the amount of (G) the alkenyloxypolyether be sufficient to provide a molar ratio of silicon bonded hydrogen atoms in (B) the polyorganohydrogensiloxane to alkenyl groups in (G) the alkenyloxypolyether (SiH:alkenyl ratio) of 2:1 to 25:1, alternatively 2:1 to 12:1.

(H) Polyvinyl Alcohol

Starting material (H) in the emulsion is a polyvinyl alcohol compound. Polyvinyl alcohol compounds are known in the art and are disclosed, for example in U.S. Patent Application Publication 2007/0099007 at paragraphs [0172] and [0173]. Polyvinyl alcohol compounds may be made by saponification of polyvinylacetate, so up to 65 mol % of polyvinylacetate may remain in the polyvinyl alcohol compound used herein. Alternatively, the polyvinyl alcohol compound may be 35 mol % to 99 mol % polyvinyl alcohol (with the balance being 65 mol % to 1 mol % polyvinylacetate). Alternatively, the polyvinyl alcohol compound may be hydrolyzed from 80% to 98%. The polyvinyl alcohol compound may have a minimum viscosity of 5 cP at 4% aqueous solution at 20° C. and alternatively up to 200 cSt. Alternatively, the polyvinyl alcohol compound may have a viscosity of 15 cSt to 55 cSt. The amount of the polyvinyl alcohol compound depends on various factors, including the type and amount of (G) the alkenyloxypolyether that is present, however the amount of polyvinyl alcohol compound may be 0 to 10 weight parts, alternatively 0 to 5 weight parts, and alternatively 0 to 3 weight parts, per 100 weight parts of starting material (A). Alternatively, the polyvinyl alcohol compound may be present in an amount of 1.5 weight parts to 10 weight parts, per 100 weight parts of starting material (A). However, the combined amounts of (G) the alkenyloxypolyether and (H) the polyvinyl alcohol compound, may be at least 3.0 weight parts per 100 parts by weight of starting material (A). Alternatively, when (G) the alkenyloxypolyether is present in an amount less than 3 weight parts per 100 parts by weight of starting material (A), then a balance to at least 3 weight parts per 100 parts by weight of starting material (A) of (H) the polyvinyl alcohol compound is present.

(I) Biocide

Starting material (I) is an optional biocide that may be added to the emulsion. Biocides are known in the art, for example, the biocide is exemplified by (11) a fungicide, (12) an herbicide, (13) a pesticide, (14) an antimicrobial agent, and a combination of two or more thereof. Exemplary biocides are disclosed, for example, in U.S. Pat. No. 9,221,041 to Brandstadt, et al. The biocide is optional. However, when used, the biocide may be present in an amount up to 1.0 weight parts, per 100 weight parts of starting material (A).

(J) Anti-Foam

The emulsion may optionally further comprise starting material (J) an anti-foaming agent (anti-foam). The amount of (J) the anti-foam may be up to 0.3 weight parts, per 100 weight parts of starting material (A). Suitable anti-foams are exemplified by emulsions containing silica and polydimethylsiloxanes. Such anti-foams are commercially available from Dow Silicones Corporation of Midland, Michigan, USA, e.g., under the tradenames DOWSIL™ AFE-1520, DOWSIL™ 7989, SYL-OFF™ EM 7989 ANTIFOAM, XIAMETER™ AFE-0100, XIAMETER™ AFE-1510, XIAMETER™ AFE-1520, or XIAMETER™ AFE-1530.

(K) Non-Functional Polyorganosiloxane

The emulsion may optionally further comprise starting material (K), a non-functional polyorganosiloxane. As used herein, "non-functional organopolysiloxane" means a polymer with a backbone comprised of alternating silicon atoms and oxygen atoms, with organic groups bonded to the other valences of the silicon atoms, where such organic groups do not undergo hydrosilylation reaction with starting materials (A) and (B). Such non-functional organopolysiloxanes may have formula $(R^1_3SiO_{1/2})_2(R^1_2SiO_{2/2})_c$, where $R^1$ is as described above, and subscript c has a value sufficient to provide the non-functional organopolysiloxane with a viscosity of 5 cSt to 60,000 cSt measured according to the test method in Reference Example B, below. Examples of non-functional organopolysiloxanes are α,ω-trialkylsiloxy-terminated polydialkylsiloxanes, such as α,ω-trimethylsiloxy-terminated polydimethylsiloxanes. Starting material (K) is optional, and may be present in an amount of 0 to 15 weight parts, per 100 weight parts of starting material (A).

Additional Starting Materials

One or more additional starting materials may be added to the emulsion described herein. The one or more additional starting materials may be selected from the group consisting of a bactericidal agent (e.g., sorbic acid), a colorant (e.g., dye or pigment), a filler (e.g., silica), and a wetting agent (e.g., a glycol such as propylene glycol or ethylene glycol). Suitable additional starting materials for use herein are exemplified by the additives described in U.S. Patent Application Publication 2007/0099007 at paragraphs to and U.S. Patent Application Publication 2002/0061365 at paragraphs [0055] to [0056].

Method of Making

The emulsion may be prepared by combining the starting materials described above, in the amounts described above, in any order of addition, optionally with a master batch, and optionally under shear. Alternatively, the emulsion may be formed by subjecting said starting materials to high shear, for example in a mixer of the rotor and stator type or in an apparatus applying increased shear such as a high pressure homogenizer, microfluidizer, colloid mill, or sonolator (ultrasonic mixer). To avoid premature reaction during formation of the emulsion, some of the starting materials may be emulsified separately. For example, all or a portion of starting material (A) may be emulsified in the absence of starting material (B), starting material (B) being added subsequently. Alternatively, starting materials (A), (B), and (G) may be emulsified in the absence of catalyst, with the catalyst being emulsified and added separately.

Alternatively, the emulsion described above may be provided in the form of a kit, e.g., with two or more separate parts that may be mixed together to form the emulsion described above. The kit may prevent hydrosilylation reaction of starting materials (A), (B), and (G) before use of the emulsion (e.g., before coating the emulsion on a surface of a substrate). Typically, this is achieved by storing (B) the polyorganohydrogensiloxane in a separate part from (C) the hydrosilylation reaction catalyst. A kit for preparing the release coating emulsion described above may comprise:

(I) a base emulsion comprising (A) the aliphatically unsaturated polyorganosiloxane, (B) the polyorganohydrogensiloxane, (D) the inhibitor, (E) water, (F) the buffer, and (G) the alkenyloxypolyether; and when present one or more of (H) the polyvinyl alcohol compound, (I) the biocide, and (K) the non-functional polyorganosiloxane; and (II) a curing agent emulsion comprising (A) the aliphatically unsaturated polyorganosiloxane, (C) the hydrosilylation reaction catalyst, (G) the alkenyloxypolyether, (E) water, and (F) the buffer optionally (III) (J) the anti-foam. The base emulsion and the curing agent emulsion (and when present, the anti-foam) may be combined, e.g., by mixing at ambient temperature to form the emulsion described above just before use. The relative amounts of base emulsion and curing agent emulsion (weight ratio of base:curing agent) may be 50:1 to 1:1, alternatively 35:1 to 1:1.

The emulsion described above comprises the silicone release coating composition (silicone phase) dispersed in the aqueous phase. The method for preparing the emulsion described above may optionally further comprise diluting the emulsion to a desired concentration of silicone phase. The method described above may optionally further comprise diluting the silicone release coating emulsion with 60 weight parts to 900 weight parts of additional water, where the additional water is as described above as starting material (E).

Method of Use

The present invention also provides a process of preparing a coated substrate with the emulsion. The method comprises disposing the emulsion on a surface of the substrate. The method further comprises heating, i.e., exposing the coated substrate to an elevated temperature, such as 50° C. to 120° C. to remove water (dry) and cure the silicone release coating composition via hydrosilylation reaction of starting materials (A), (B), and (G), thereby giving the coated substrate.

The emulsion may be disposed or dispensed on the surface of the substrate in any suitable manner. Typically, the emulsion is applied in wet form via a wet coating technique. In certain embodiments, the emulsion is applied by i) spin coating; ii) brush coating; iii) drop coating; iv) spray coating; v) dip coating; vi) roll coating; vii) flow coating; viii) slot coating; ix) gravure coating; x) size press coating; xi) film press coating; xii) curtain coating; or xiii) a combination of any of i) to xii). Typically, disposing the emulsion on the substrate results in a wet deposit on the substrate, which is subsequently dried and cured to give the coated substrate, which comprises a cured silicone release coating on the surface of the substrate.

The substrate is not limited and may be any substrate. The substrate may have an integrated hot plate or an integrated or stand-alone furnace for drying and curing the deposit. The substrate may optionally have a continuous or non-continuous shape, size, dimension, surface roughness, and other characteristics. In certain embodiments, the substrate has a softening point temperature at the elevated temperature.

The substrate may comprise a plastic, which may be a thermosetting and/or thermoplastic. Alternatively, the substrate may comprise a paper, which may be suitable for food contact applications. Specific examples of suitable substrates include polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyvinyl alcohols (PVA); polyetheretherketones (PEEK); polyetherketoneketones (PEKK); polyarylates (PAR); or polyethernitriles (PEN); celluloses such as triacetylcellulose, diacetylcellulose, or cellophane; and paper such as Kraft paper.

The emulsion, or wet deposit, is typically dried and cured at the elevated temperature for a period of time. The period of time is typically sufficient to effect curing, i.e., cross-linking, of starting materials comprising (A), (B), and (G). In certain embodiments, the period of time is >0 to 8 hours, alternatively >0 to 2 hours, alternatively >0 to 1 hour, alternatively >0 to 30 minutes, alternatively >0 to 10 minutes, alternatively >0 to 2 minutes, alternatively >0 to 1 minute, and alternatively >0 to 30 seconds. The period of time depends on various factors including the elevated temperature selected, desired film thickness, and amount of water.

Curing typically has a dwell time of 0.5 second to 50 seconds; alternatively 1 second to 10 seconds. Dwell time, as used herein, refers to the time during which the starting materials comprising (A), (B), (C) and (G) are subjected to the elevated temperature. Dwell time is distinguished from cure time, as there may be ongoing curing even after the wet deposit, or partially cured reaction intermediary thereof is no longer subjected to the elevated temperature, which typically initiates curing. Alternatively, the coated article may be prepared on a conveyor belt in an oven, and the dwell time may be calculated by dividing a length of the oven (e.g., in meters) by a line speed of the conveyor belt (e.g., in meters/sec).

The period of time may be broken down into cure iterations, e.g., a first-cure and a post-cure, with the first-cure being, for example, one hour and the post cure being, for example, three hours. The elevated temperature may be independently selected from any temperature above room temperature in such iterations and may be the same in each iteration.

Depending on a thickness and other dimensions of the film and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 time to 50 times, to build the coated article as desired. A composite is of partially cured layers is typically subjected to a final post-cure, e.g., at the elevated temperature and period of time above. Each elevated temperature and period of time may be independently selected and may be the same as or different from one another. When the article is formed via the iterative process, each deposit may also be independently selected and may differ in terms of components selected in the composition and/or their amounts. Alternatively still, each iterative layer may be fully cured, rather than only being partially cured, in such an iterative process.

The deposit may comprise a wet film, and the iterative process may be wet-on-wet, depending on a cure state of the partially cured layer. Alternatively, the iterative process may be wet-on-dry. The coated substrate, which comprises the film formed from the emulsion on the substrate, may have varying dimensions, including relative thicknesses of the film and the substrate. When cured, the resulting silicone release coating has a thickness that may vary depending upon its end use application. Typically, the silicone release coating has a thickness of >0 to <1 μm, alternatively >0 to 0.9 μm, alternatively >0 to 0.75 μm, alternatively >0 to 0.5 μm, alternatively >0 to 0.25 μm, alternatively >0 to 0.2 μm. However, other thicknesses are contemplated, e.g., from 0.05 μm to 0.2 μm. For example, the thickness of the film may be 0.1 μm to 10 μm; alternatively 0.15 μm to 5 μm; alternatively 0.2 μm to 2 μm; and alternatively 0.2 μm and 0.6 μm. Alternatively, when the substrate is plastic, or a plastic coated paper wherein the surface of the substrate with the film thereon comprises the plastic, the film may have a thickness of 0.05 to <1 μm, alternatively 0.05 to 0.9 μm, alternatively from 0.05 to 0.8 μm. Alternatively, when the substrate is paper, the film may have a thickness of 0.2 to <1 μm, alternatively 0.2 to 0.9 μm, alternatively 0.2 to 0.8 μm, alternatively 0.2 μm to 0.7 μm, alternatively 0.2 μm to 0.6 μm; alternatively 0.2 μm to 0.5 μm; and alternatively 0.2 μm to 0.3 μm.

The coated substrate may be utilized in food contact applications such as bakery release papers. It is desirable that the silicone release coating has low extractables, high anchorage to the substrate, and low water uptake wen the coated substrate will be utilized in food contact applications. For example, the emulsion described herein may be used in a method for forming a bakery paper, the method comprising:

(1) coating, on a paper substrate, the emulsion of any one of claims 1 to 10 in an amount sufficient to provide a coat weight of 0.2 to 1.0 g/$m^2$ after cure of the silicone release coating, (2) drying the paper substrate, and (3) curing the silicone release coating.

EXAMPLES

These examples are intended to illustrate the invention to one of ordinary skill in the art and are not to be construed as limiting the invention set forth in the claims. The starting materials used in these examples are described below in Table 1.

TABLE 1

Starting Materials

| Starting Material | Chemical Description | Source |
|---|---|---|
| (A-1) | Linear vinyldimethylsiloxy-endblocked polydimethylsiloxane with vinyl content 0.6% and viscosity 250 cSt (Vi EB PDMS) | 2-7038 from DSC |
| (B-1) | Linear trimethylsiloxy-terminated poly(dimethyl/methylhydrogen)siloxane with SiH content 0.9% SiH and viscosity 31 cSt (SiH MF PDMS) | SYL-OFF ™ 7672 Crosslinker from DSC |
| (K-1) 200 Fl, Non-functional Organopolysiloxane | Trimethylsiloxy-terminated polydimethylsiloxane (EB PDMS) | DOWSIL ™ 200 FLUID from DSC |
| (H-1) | Solution of 90 weight parts water, 10 weight parts of polyvinyl alcohol compound with a viscosity of 30 cP at 4% aqueous solution at 20° C. and a saponification value of 88 mol % (tradename GOHSENOL ™ GH17R from Mitsubishi Chemical), and a biocide. | |
| (H-2) | Solution of 90 weight parts water, 10 weight parts of polyvinyl alcohol compound with a viscosity of 30 cP at 4% aqueous solution at 20° C. and a saponification value of 92 mol %. (tradename POVAL ™ 30-92 from Kuraray), and a biocide | |
| (E-1) | Water | |
| (C-1) | Catalyst emulsion containing vinyl-terminated polydimethylsiloxane with vinyl content 0.6% Vi and Pt SYL-OFF ™ 7975 Coating | DSC |
| (G-1) | An allyl polyethoxylate with 10 ethylene oxide units per molecule and molar mass 500 g/mol. | PLURIOL ™ A 10R4 from BASF |
| (G-2) | An allyl polyethoxylate with 16 ethylene oxide units per molecule and molar mass 750 g/mol. | PLURIOL ™ A 750 R from BASF |
| (G'-3) | An unreactive alkoxylated polyether surfactant, C-10 ethoxylate with 10 ethylene oxide units per molecule with molar mass 598 g/mol. 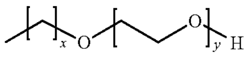 | LUTENSO ™ XP100 from BASF |
| (J-1) | Anti-foam emulsion containing silica and polydimethylsiloxanes SYL-OFF ™ EM 7989 ANTIFOAM | DSC |
| (D-1) | ETCH, ethynyl cyclohexanol | BASF |

Starting materials with the DOWSIL™ and SYL-OFF trademarks are commercially available from DSC, which means Dow Silicones Corporation of Midland, Michigan, USA.

Reference Example A—Vi/Hexenyl Content and SiH Content Measured by NMR

NMR spectroscopy was used to determine the vinyl content and SiH content of starting materials in Table 1 as follows. Nuclear Magnetic Resonance (NMR) spectra were obtained on a NMR BRUKER AVIII (400 MHz), using a silicon-free 10 mm tube and $CDCl_3/Cr(AcAc)_3$ solvent. Chemical shifts for 29Si-NMR spectra were referenced to internal solvent resonance and are reported relative to tetramethylsilane.

Reference Example B—Dynamic Viscosity (cSt)

Dynamic viscosity of starting materials in Table 1 was measured as follows. Dynamic viscosity (DV) was measured with a Brookfield Viscometer DV-I Prime equipped with spindle 2 to 4, at speed from 20 to 100 rpm and at a temperature of 25° C.

In this Reference Example 1, samples of base emulsions were prepared by combining the starting materials and their amounts as shown below in Table 2. Amounts of each starting material are shown in weight %. The preparation of base emulsion was made in a laboratory. The pH buffered water (containing water, citric acid monohydrate and sodium hydroxide) was first weighed and blended. The polymers (A-1), (B-1), and (K-1) were weighed and blended separately, and the surfactants, (G) and (H), were added under mixing. The buffered water was then poured in and stirred for 5 minutes. The resulting premix was then emulsified using the High Pressure Sonolator at 100 bars until targeted particle size (dv0.9 of 1 micrometer to 2 micrometers) was reached. The recovered quantity was blended with (D-1) the hydrosilylation inhibitor and the biocide package, which was commercially available and used in the same amount for each base emulsion.

TABLE 2

| | Base Emulsions | | | | | |
|---|---|---|---|---|---|---|
| Starting Material/Calculations | C1 | C2 | 1 | 2 | 3 | 4 |
| (A-1) Linear Vinyl EB PDMS | 36.44 | 36.44 | 36.44 | 36.44 | 36.44 | 36.44 |
| (B-1) Linear SiH MF PDMS | 1.56 | 1.56 | 1.56 | 1.56 | 1.56 | 1.56 |
| (K-1) Trimethyl EB PDMS | 2 | 2 | 2 | 2 | 2 | 2 |
| (H-1) Polyvinyl alcohol | 10 | 0 | 10 | 0 | 10 | 0 |
| (H-2) Polyvinyl alcohol | 0 | 10 | 0 | 10 | 0 | 10 |
| (G'-3) Alkyloxypolyether | 3 | 3 | 0 | 0 | 0 | 0 |
| (G-1) Allyloxypolyether (10 EO) | 0 | 0 | 3 | 3 | 0 | 0 |
| (G-2) Allyloxypolyether (16 EO) | 0 | 0 | 0 | 0 | 3 | 3 |
| (E-1) Water | 47 | 47 | 47 | 47 | 47 | 47 |
| Total Siloxane content | 40 | 40 | 40 | 40 | 40 | 40 |
| SiH:Vi ratio | 1.65 | 1.65 | 1.65 | 1.65 | 1.65 | 1.65 |

In this Reference Example 2, samples of emulsions (Bath/Emulsion) were prepared as follows: A base emulsion prepared as described in Reference Example 1 was combined with a catalyst emulsion (C-1), water, and an anti-foam, which are described in Table 1. Amounts in weight parts are shown in Table 3.

TABLE 3

| Emulsions | |
|---|---|
| Starting Materials | Bath/ Emulsion |
| Base Emulsion | 95 |
| Catalyst emulsion (C-1) | 5 |
| Water (E-1) | 60 to 300 |
| Anti-foam (J-1) | 0.3 |
| Total | 160.3 to 400.3 |

In this Reference Example 3, bakery paper substrates were treated with emulsions prepared as described in Reference Example 2 with an average silicon coat weight of 0.4 $g/m^2$. Silicon coat weight (CW), immediate extractables, post-cure extractables, water uptake (Cobb), and anchorage were evaluated as follows:

Silicon coat weights were measured by X-ray Fluorescence using an Oxford lab-x3500 XRF Analyzer after silicon elemental calibration with samples' standards. An XRF measure of a blank substrate was performed prior to 3 measures of coated-paper samples leading to an average silicon coat weight or thickness expressed in $g/m^2$.

The water resistance of paper substrates was tested by the conventional absorption test known as Cobb test described for instance in TAPPI 441 om-04 test method. Samples were exposed to water for 45 seconds and the amount of water absorbed after a total of 60 seconds was measured by the weight. The "Cobb value" represented the mass of absorbed water expressed in $g/m^2$. The lower the Cobb value, the higher the water resistance of the substrate. A Cobb value of less than 20 $g/m^2$ was desired by some customers, and a Cobb value less than 15 $g/m^2$ was desired by other customers.

The anchorage test provided a quantitative determination of the rub-off resistance of silicone release coating anchoring on the substrate after an abrasion test. The silicon content of a coated substrate was determined by XRF before and after rub-off with an abrasion tester and was expressed as a % of Si left after rub-off compared to 100% initially coated. The higher the Si % left after rub-off the higher the anchorage or abrasion resistance.

Silicone extractables in % of a coated paper was measured by its silicone CW before vs. after (20 min) immersion in MIBK. The solvent dissolves uncured silicone and the percentage loss is determined. This test is carried out immediately after the paper was coated and after 24 h aging at RT, called immediate extractable ('IM Ext') and post-cure extractable ('PC Ext'). The results are reported in Table 4.

TABLE 4

| Example # | Performance target | C1 | C2 | 1 | 2 | 3 | 4 |
|---|---|---|---|---|---|---|---|
| Results on Bakery Paper, with an average silicon coat weight of 0.4 g/m$^2$ | | | | | | | |
| PVA grade | | (H-1) | (H-2) | (H-1) | (H-2) | (H-1) | (H-2) |
| Surfactant | | (G'-3) | (G'-3) | (G-1) | (G-1) | (G-2) | (G-2) |
| CW g/m$^2$ | | 0.44 | 0.44 | 0.39 | 0.43 | 0.45 | 0.26 |
| Immediate Extractables % | <10% | 10.6 | 15.1 | 7.2 | 8.1 | 6.2 | 7.5 |
| Post Cure Extractables % | <6% | 3.2 | 5.0 | 5.1 | 4.2 | 4.5 | 3.3 |
| Anchorage/abrasion resistance % | >90% | 87.2 | 89.4 | 91.7 | 95.3 | 93.9 | 90.9 |
| Water uptake (Cobb) g/m$^2$ | <15 g/m$^2$ | 15.6 | 15.8 | 13.6 | 12.0 | 11.6 | 14.0 |
| Baking residues g/m$^2$ | <12 g/m$^2$ | >13 | >14 | 8.9 | 10.5 | 8.0 | 11.0 |

Table 4 showed that the comparative silicone release coating emulsions containing unreactive Lutensol XP100 (C1, C2) produced silicone release coatings with significantly higher levels of immediate extractables compared to the silicone release coating emulsions containing alkenyloxypolyethers (reactive surfactants) (1, 2, 3, 4). This indicated the comparative examples C1 and C2 had slower and more incomplete cure than examples 1, 2, 3, and 4. Examples 1 to 4 produced silicone release coatings that were immediately fully cured, thus indicating this invention allows for freshly produced siliconized rolls of bakery paper to be produced, slitted and loaded fast for transportation and distribution.

Furthermore, the anchorage and abrasion resistance of the silicone release coatings prepared in Examples 1 to 4 was improved over Comparative Examples C1 and C2. Examples 1 to 3 showed much improvement, and Example 4 showed improvement even at relatively low coat weight, over Comparative Examples C1 and C2.

Water uptake showed a positive significant decrease for Examples 1 to 3 compared to C1 and C2, and even at 40% lower coat weight for Example 4, water uptake decreased compared to C1 and C2. Without wishing to be bound by theory, it is thought that this will enable food packaging manufacturers to envisage access to new food paper packaging applications such as frozen food packaging, steam cooking, and oven or microwave paper pouch cooking using coated papers prepared using the silicone release coating emulsions of this invention.

The anti-adhesive performance measured by the baking residues test—the lower the better—also improved using silicone release coating emulsion containing the alkenyloxypolyether in each of Examples 1 to 4 as compared to the comparative coating emulsion containing nonreactive surfactants in C1 and C2, even at lower coat weight, promoting a thinner coat weight for improved recyclability and compostability as well as lower cost and production improvements.

Industrial Applicability

Problems to be Addressed: The use of silicone release coating emulsions for coating paper substrates for food contact applications, thereby providing the paper substrate, e.g., bakery paper, with release performance and water resistance is desired as an attractive alternative to the health concerns related to fluorinated materials and chromium containing materials for the same application. However, paper machine in-line runnability issues, such as dust formation has been a major difficulty for the use of silicone emulsions.

Solution: The silicone release coating emulsion described herein can be used to prepare a silicone release coating on a paper substrate suitable for food contact applications. The silicone release coating emulsion can be applied to the paper substrate and dried and cured to form a silicone release coating thereon (as shown in the examples above where the anchorage test method described above shows a high percentage of silicone release coating remaining on the substrate after the test. Furthermore, the emulsion described herein may produce a silicone release coating with other benefits (as compared to a coating produced with a silicone release coating emulsion containing a nonreactive surfactant), such as lower extractables, thereby minimizing potential for migration onto food. Other benefits are as described above with the data in Table 4.

Definitions and Usage of Terms

In this application, all amounts, ratios, and percentages are by weight unless otherwise indicated. The amounts of all starting materials in an emulsion or other composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The transitional phrases "comprising", "consisting essentially of", and "consisting of" are used as described in the Manual of Patent Examining Procedure Ninth Edition, Revision 08.2017, Last Revised January 2018 at section § 2111.03 I, II, and III. The abbreviations used herein have the definitions in Table 11. The disclosure of ranges includes the range itself and also anything subsumed therein, as well as endpoints. For example, disclosure of a range of, for example, 15 to 400 includes the subsets of, for example, 15 to 137, 138 to 265, and 266 to 400, as well as any other subset subsumed in the range. Similarly, the disclosure of Markush groups includes the entire group and also any individual members and subgroups subsumed therein. For example, disclosure of the Markush group (i) α,ω-dimethylhydrogensiloxy-terminated poly(dimethylsiloxane/methylhydrogensiloxane), (ii) α,ω-dimethylhydrogensiloxy-terminated polymethylhydrogensiloxane, (iii) α,ω-trimethylsiloxy-terminated poly(dimethylsiloxane/methylhydrogensiloxane), (iv) α,ω-trimethylsiloxy-terminated polymethylhydrogensiloxane, (v) α-dimethylhydrogensiloxy-ω-trimethylsiloxy-terminated poly(dimethylsiloxane/methylhydrogensiloxane), (vi) α-dimethylhydrogensiloxy-ω-trimethylsiloxy-terminated polymethylhydrogensiloxane, (vii) a combination of two or more thereof, includes the member (iii) α,ω-trimethylsiloxy-terminated poly(dimethylsiloxane/methylhydrogensiloxane) individually; the subgroup (iii) α,ω-trimethylsiloxy-terminated poly(dimethylsiloxane/methylhydrogensiloxane) and (iv) α,ω-trimethylsiloxy-terminated polymethylhydrogensiloxane, and any other individual member and subgroup subsumed therein.

The following abbreviations used in this application have the definitions described below in Table 7.

TABLE 7

Abbreviations

| Abbreviation | Definition |
|---|---|
| AcAc | Acetyl acetonate |
| ° C. | degrees Celsius |
| cP | centipoise |
| cSt | centistoke |
| CW | Coat weight |
| EB | Endblocked |
| g | Gram |
| h | Hour |
| Hex | Hexenyl |
| $m^2$ | Meters squared |
| Me | Methyl |
| MF | Multi-functional, indicates that a polyorganosiloxane has pendant functional (e.g., alkenyl) groups |
| MIBK | Methyl isobutyl ketone |
| mPa · s | milliPascal seconds |
| PDMS | Polydimethylsiloxane |
| ppm | Parts per million |
| rpm | Revolutions per minute |
| RT | Room temperature of 25 ± 2° C. |
| Q | A quadrifunctional siloxane unit of formula ($SiO_{4/2}$) (silicate unit) |
| μm | Micrometer |
| Vi | Vinyl |
| XRF | X-ray Fluorescence |

Embodiments of the Invention

In a first embodiment, a bakery paper suitable for food contact applications comprises: a substrate comprising paper, and a silicone release coating coated on a surface of the substrate, wherein the silicone release coating is prepared by a method comprising:

(1) applying, on the surface of the substrate, a silicone release coating emulsion comprising
   (A) an aliphatically unsaturated polyorganosiloxane of unit formula $(R^1{}_3SiO_{1/2})_i(R^1{}_2R^3SiO_{1/2})_f(R^1{}_2SiO_{2/2})_g(R^1R^3SiO_{2/2})_h(SiO_{4/2})_j$, each $R^1$ is an independently selected alkyl group, each $R^3$ is an independently selected alkenyl group, subscripts i, f, g, h, and j represent average numbers of each siloxane unit per molecule, and subscripts i, f, g, h, and j have values such that $0\le i\le 4$; f is 0 to 4:$0\le g\le 1400$; $0\le h\le 200$; and j is 0 or 1; with the provisos that a quantity (i+f)=2 to 4 then a quantity (f+h)≥2, and a quantity (i+f+g+h) is 15 to 1400;
   (B) a polyorganohydrogensiloxane in an amount sufficient to provide a molar ratio of silicon bonded hydrogen atoms in (B) the polyorganohydrogensiloxane to silicon bonded alkenyl groups in (A) the aliphatically unsaturated polyorganosiloxane (an SiH:SiVi ratio) of 1.2:1 to 3.0:1;
   (C) a hydrosilylation reaction catalyst in an amount sufficient to provide 10 ppm to 1000 ppm of a platinum group metal based on combined weights of (A) the aliphatically unsaturated polyorganosiloxane and (B) the polyorganohydrogensiloxane;
   0.02 weight part to 0.8 weight part, per 100 weight parts of (A) the aliphatically unsaturated polyorganosiloxane, of (D) a hydrosilylation reaction inhibitor;
   (E) water;
   0.4 weight part to 1.6 weight parts, per 100 weight parts of (A) the aliphatically unsaturated polyorganosiloxane, of (F) a buffer;
   0.05 weight part to 10 weight parts, per 100 weight parts of (A) the aliphatically unsaturated polyorganosiloxane, of (G) an alkenyloxypolyether, wherein amounts of (B) the polyorganohydrogensiloxane and (G) the alkenyloxypolyether are sufficient to provide a molar ratio of silicon bonded hydrogen atoms in (B) the polyorganohydrogensiloxane to alkenyl groups in (G) the alkenyloxypolyether (SiH:alkenyl ratio) of 2:1 to 25:1;
   0 to 10 weight parts, per 100 weight parts of (A) the aliphatically unsaturated polyorganosiloxane, of (H) a polyvinyl alcohol compound;
   optionally (I) a biocide;
   0 to 0.3 weight parts, per 100 weight parts of (A) the aliphatically unsaturated polyorganosiloxane, of (J) an anti-foam; and
   0 to 15 weight parts, per 100 weight parts of (A) the aliphatically unsaturated polyorganosiloxane, of (K) a non-functional polyorganosiloxane of unit formula $(R^1{}_3SiO_{1/2})_2(R^1{}_2SiO_{2/2})_c$, where $R^1$ is as described above, and subscript c has a value sufficient to give the non-functional polyorganosiloxane a viscosity of 5 to 60,000 cSt when tested at 25° C. by rotational viscometry; in an amount sufficient to provide a coat weight of 0.2 to 1.0 g/$m^2$ after curing to form the silicone release coating,
(2) drying the substrate, and
(3) curing the silicone release coating.

In a second embodiment, in the method of the first embodiment, (A) the aliphatically unsaturated polyorganosiloxane is a bis-alkenyl-terminated polydiorganosiloxane with unit formula $(R^1{}_2R^3SiO_{1/2})_2(R^1{}_2SiO_{2/2})_g$, where each $R^1$ is methyl, each $R^3$ is vinyl, and subscript g is 15 to 1200.

In a third embodiment, in the method of the first embodiment or the second embodiment, (B) the polyorganohydrogensiloxane has unit formula $(R^1{}_3SiO_{1/2})_2(R^1HSiO_{2/2})_z$, where $R^1$ is methyl and $3\le z\le 250$.

In a fourth embodiment, in the method of any one of the first to third embodiments, the polyvinyl alcohol compound is present in an amount of 2.5 weight parts to 10 weight parts, per 100 weight parts of starting material (A), and the polyvinyl alcohol compound has a viscosity of 5 cSt to 200 cSt.

In a fifth embodiment, in the method of any one of the first to fourth embodiments, the alkenyloxypolyether is linear.

In a sixth embodiment, in the method of any one of the first to fifth embodiments, the alkenyloxypolyether has formula:

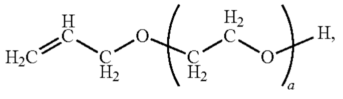

where subscript a is 10 to 16.

In a seventh embodiment, in the method of the sixth embodiment, where the amounts of (B) the polyorganohydrogensiloxane and (G) the alkenyloxypolyether are sufficient to provide an SiH:alkenyl ratio of 2:1 to 12:1.

The invention claimed is:

1. A silicone release coating emulsion comprising:

(A) an aliphatically unsaturated polyorganosiloxane of unit formula $(R^1_3SiO_{1/2})_i(R^1_2R^3SiO_{1/2})_f(R^1_2SiO_{2/2})_g(R^1R^3SiO_{2/2})_h(SiO_{4/2})_j$, each $R^1$ is an independently selected alkyl group, each $R^3$ is an independently selected alkenyl group, subscripts i, f, g, h, and j represent average numbers of each siloxane unit per molecule, and subscripts i, f, g, h, and j have values such that $0 \le i \le 4$; f is 0 to 4; $0 \le g \le 1400$; $0 \le h \le 200$; and j is 0 or 1; with the provisos that a quantity (i+f)=2 to 4 then a quantity (f+h)≥2, and a quantity (i+f+g+h) is 15 to 1400;

(B) a polyorganohydrogensiloxane in an amount sufficient to provide a molar ratio of silicon bonded hydrogen atoms in (B) the polyorganohydrogensiloxane to silicon bonded alkenyl groups in (A) the aliphatically unsaturated polyorganosiloxane (an SiH:SiVi ratio) of 1.2:1 to 3.0:1;

(C) a hydrosilylation reaction catalyst in an amount sufficient to provide 10 ppm to 1000 ppm of a platinum group metal based on combined weights of (A) the aliphatically unsaturated polyorganosiloxane and (B) the polyorganohydrogensiloxane;

0.02 weight part to 0.8 weight part, per 100 weight parts of (A) the aliphatically unsaturated polyorganosiloxane, of (D) a hydrosilylation reaction inhibitor;

(E) water;

0.4 weight part to 1.6 weight parts, per 100 weight parts of (A) the aliphatically unsaturated polyorganosiloxane, of (F) a buffer;

0.05 weight part to 10 weight parts, per 100 weight parts of (A) the aliphatically unsaturated polyorganosiloxane, of (G) an alkenyloxypolyether, wherein amounts of (B) the polyorganohydrogensiloxane and (G) the alkenyloxypolyether are sufficient to provide a molar ratio of silicon bonded hydrogen atoms in (B) the polyorganohydrogensiloxane to alkenyl groups in (G) the alkenyloxypolyether (SiH:alkenyl ratio) of 2:1 to 25:1;

0 to 10 weight parts, per 100 weight parts of (A) the aliphatically unsaturated polyorganosiloxane, of (H) a polyvinyl alcohol compound;

optionally (I) a biocide;

0 to 0.3 weight parts, per 100 weight parts of (A) the aliphatically unsaturated polyorganosiloxane, of (J) an anti-foam; and 0 to 15 weight parts, per 100 weight parts of (A) the aliphatically unsaturated polyorganosiloxane, of (K) a non-functional polyorganosiloxane of unit formula $(R^1_3SiO_{1/2})_2(R^1_2SiO_{2/2})_c$, where $R^1$ is as described above, and subscript c has a value sufficient to give the non-functional polyorganosiloxane a viscosity of 5 to 60,000 cSt when tested at 25° C. by rotational viscometry.

2. The emulsion of claim 1, where in the unit formula for (A) the aliphatically unsaturated polyorganosiloxane i=j=h=0, subscript f=2, and the aliphatically unsaturated polyorganosiloxane is a bis-alkenyl-terminated polydiorganosiloxane with unit formula $(R^1_2R^3SiO_{1/2})_2(R^1_2SiO_{2/2})_g$, where each $R^1$ is methyl, each $R^3$ is vinyl, and subscript g is 15 to 1200.

3. The emulsion of claim 1, where (B) the polyorganohydrogensiloxane has unit formula $(R^1_3SiO_{1/2})_2(R^1HSiO_{2/2})_z$, where $R^1$ is methyl and $3 \le z \le 250$.

4. The emulsion of claim 1, where (C) the hydrosilylation reaction catalyst comprises a complex with an alkenyl functional polydialkylsiloxane and platinum.

5. The emulsion of claim 1, where (D) the hydrosilylation reaction inhibitor comprises an acetylenic alcohol.

6. The emulsion of claim 1, where (F) the buffer comprises citric acid and sodium hydroxide.

7. The emulsion of claim 1, where (H) the polyvinyl alcohol compound is present in an amount of 1.5 weight parts to 10 weight parts, per 100 weight parts of starting material (A), and the polyvinyl alcohol compound has a viscosity of 5 cSt to 200 cSt.

8. The emulsion of claim 1, where (K) the polyorganosiloxane is present and comprises an α,ω-trimethylsiloxy-terminated polydimethylsiloxane.

9. The emulsion of claim 1, where (G) the alkenyloxypolyether has formula:

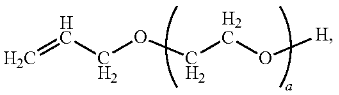

where subscript a is 10 to 16.

10. The emulsion of claim 9, where the amounts of (B) the polyorganohydrogensiloxane and (G) the alkenyloxypolyether are sufficient to provide an SiH:/alkenyl ratio of 2:1 to 12:1.

11. A kit for preparing the release coating emulsion of claim 1, where the kit comprises:

(I) a base emulsion comprising (A) the aliphatically unsaturated polyorganosiloxane, (B) the polyorganohydrogensiloxane, (D) the inhibitor, (E) water, (F) the buffer, and (G) the alkenyloxypolyether; and when present one or more of (H) the polyvinyl alcohol, (I) the biocide, and (K) the polyorganosiloxane; and (II) a curing agent emulsion comprising (A) the aliphatically unsaturated polyorganosiloxane, (C) the hydrosilylation reaction catalyst, (G) the alkenyloxypolyether, (E) water, (F) the buffer, and when present; and when present one or more of (H) the polyvinyl alcohol compound, (I) the biocide, and (K) the non-functional polyorganosiloxane; and optionally (III) a third part comprising (J) the anti-foam.

12. A method for forming the emulsion of claim 1, wherein the method comprises:

(1) emulsifying starting materials comprising (A) the aliphatically unsaturated polyorganosiloxane, (B) the polyorganohydrogensiloxane, (D) the inhibitor, (E) water, (F) the buffer, and (G) the alkenyloxypolyether; and when present one or more of (H) the polyvinyl alcohol, (I) the biocide, and (K) the polyorganosiloxane; thereby forming a base;

(2) combining 1 to 50 weight parts of the base, per 1 weight part of a curing agent emulsion, wherein the curing agent emulsion comprises (A) the aliphatically unsaturated polyorganosiloxane, (C) the hydrosilylation reaction catalyst, (G) the alkenyloxypolyether, (E) water, and (F) the buffer;

optionally (3) combining (J) the anti-foam; thereby forming the silicone release coating emulsion; and optionally (4) diluting the silicone release coating emulsion with 60 weight parts to 900 weight parts of additional water.

13. The method of claim 12, where step (2), and when present step (3), are performed at a temperature less than 50° C.

14. A method for forming a bakery paper, the method comprising:

(1) applying, on a substrate comprising paper, the emulsion of claim 1 in an amount sufficient to provide a coat weight of 0.2 to 1.0 $g/m^2$ after cure of the silicone release coating, (2) drying the substrate, and (3) curing the silicone release coating.

15. A method comprising: preparing an emulsion using the kit of claim 11, where the method comprises mixing (I) the base emulsion and (II) the curing agent emulsion, and when present (III) the third part, thereby preparing the emulsion, and disposing the emulsion on a surface of a substrate comprising plastic.

* * * * *